United States Patent
Brooks

(10) Patent No.: US 6,589,058 B2
(45) Date of Patent: Jul. 8, 2003

(54) CHILD'S LEARNING CHAIR

(75) Inventor: Dolores Brooks, 4602 Bishop Carol Dr., Upper Marlboro, Prince Georges County, MD (US) 20772

(73) Assignees: Dolores Brooks, Crofton, MD (US); Lawrence C. Smith, Washington, DC (US)

(*) Notice: Subject to any disclaimer, the term of this patent is extended or adjusted under 35 U.S.C. 154(b) by 0 days.

(21) Appl. No.: 09/887,247

(22) Filed: Jun. 22, 2001

(65) Prior Publication Data

US 2001/0035671 A1 Nov. 1, 2001

Related U.S. Application Data

(63) Continuation-in-part of application No. 09/519,334, filed on Mar. 7, 2000.

(51) Int. Cl.[7] .......................... G09B 25/00; A63H 33/30
(52) U.S. Cl. ....................................... 434/365; 446/482
(58) Field of Search ........................ 434/365; 446/321, 446/482; 297/181, 183.3, 189.13, 218.1, 250.1, 463.2, 188.01, 188.03, 188.1; D6/333, 339, 358, 359; 40/320

(56) References Cited

U.S. PATENT DOCUMENTS

| 894,561 | A | * | 7/1908 | Wood | 297/188.03 |
|---|---|---|---|---|---|
| 1,767,708 | A | * | 6/1930 | Simpson | 297/188.03 |
| 1,832,642 | A | * | 11/1931 | Leff | 297/188.03 |
| 3,100,128 | A | * | 8/1963 | Gleitsman | 297/188.03 |
| 3,149,879 | A | * | 9/1964 | Steiber | 297/188.03 |
| 3,592,506 | A | * | 7/1971 | Breslow | 297/193 |
| D223,757 | S | * | 6/1972 | Kinstley | D15/1 |
| 3,913,976 | A | * | 10/1975 | Plancher | 297/345 |
| 4,165,124 | A | * | 8/1979 | Olan | 297/190 |
| D276,361 | S | * | 11/1984 | Hyman | D23/53 |
| 4,883,317 | A | * | 11/1989 | Davenport | 297/193 |
| 5,369,797 | A | * | 11/1994 | Tyree | 45/349 |
| D356,449 | S | * | 3/1995 | Frye | D6/359 |
| 5,507,551 | A | * | 4/1996 | Barry | 297/181 |
| 5,560,680 | A | * | 10/1996 | Salvador | 297/256.15 |
| 5,660,436 | A | * | 8/1997 | Wilson | 297/233 |
| 5,683,137 | A | * | 11/1997 | McDonald | 297/217.3 |
| D410,795 | S | * | 6/1999 | Elbein | D6/333 |
| 6,309,016 | B1 | * | 10/2001 | Aloisi | 297/181 |

* cited by examiner

Primary Examiner—Derris H. Banks
Assistant Examiner—Kurt Fernstrom
(74) Attorney, Agent, or Firm—Lacasse & Associates, LLC; Randy W. Lacasse; Jaclyn A. Schade

(57) ABSTRACT

The learning chair helps to teach a child important tools for life, such as how to tell time and days of the week, how to organize a daily wardrobe, and develop communication and organizational skills. The chair is shaped in the form of a fictional character or likable "buddy" to a child, such as a robot, doll, action figure, or cartoon character. A child learns how to prepare a daily wardrobe and vocabulary for placement of pants, dresses, shirts, hats, and shoes. The learning chair is a fun communication tool between a parent and child. The chair has the ability to play pre-recorded messages as alarms on a clock. Messages may be pre-recorded according to the voice of a fictional character portrayed by the chair, or pre-recorded by a parent or adult. Messages may include personal announcement using the child's name such as time to wake up, get dressed, go to bed, take a bath, etc. The chair has a chalkboard for leaving written messages between the parent and child. A child may also change the expressions on the face of the chair's character with removable facial indicia in the appearance of different moods. The chair is constructed of plastic or wood and has various hollowed compartments, drawers, and sacks for storage.

18 Claims, 6 Drawing Sheets

CHILD'S LEARNING CHAIR

RELATED APPLICATIONS

The present application is a continuation-in-part of U.S. application Ser. No. 09/519,334 entitled "Child's Learning Chair", filed Mar. 7, 2000, currently pending.

BACKGROUND OF THE INVENTION

1. Field of Invention

The present invention relates generally to the field of child learning tools. More specifically, the present invention is related to an educational chair.

Part of growing up for a child is learning the practical things of getting dressed and ready for school, learning how to keep clothes neatly organized, and learn from instructions of parents. Many parents see these tasks as a necessary part of raising the child, but do not have a way to motivate the child to enjoy learning while he or she is growing up. Children often play with dolls, heroes, and cartoon or action figures and enjoy seeing these displayed on items of clothing, toiletries, bedspreads, and school supplies.

2. Discussion of Prior Art

The prior art is replete with examples of learning tools for early education. Typically, these tools are directed to using animated characters, color and/or sound to teach younger children the basics with respect to speaking, walking and later, school related elements such as reading, writing and math.

A child's chair is also known as evidenced by U.S. Pat. Nos. 4,586,747; 5,354,118; 5,507,551; 4,909,573; 5,941,599; D276,361; D410,795; D356,449; D265,440; and D206,710. Typically, these devices are used to support a child (e.g., car seat, booster seat, or high chair). Animated or facsimile shapes of characters (e.g., bears) are used to make the child more accepting of the chair itself. In some cases, the chair may provide additional learning features such as toilet training (D276,361) or telling time (D410,795). However, the prior art has failed to provide for a chair that teaches the basic skills needed in day-to-day routines (e.g., getting dressed) associated with a younger child.

Whatever the precise merits, features and advantages of the above cited references, none of them achieve or fulfills the purposes of the present invention.

SUMMARY OF THE INVENTION

This invention relates to a learning device for children in the form of a child's chair. This device helps to teach a child various important tools for life, such as how to tell the time of day and the days of the week, how to organize a wardrobe and other objects into compartments, communicate in writing, and vocabulary.

The present invention chair acts as a storage and organizational unit for various articles of children's clothing. The chair saves parents time in the morning getting a child ready for school. A child may learn vocabulary and how to prepare his or her wardrobe with various hooks, bars, and areas of the chair that correspond to placement of wardrobe items. For example, the back of the chair has bars and hooks to hold a child's pants, shirt, or dress. The "shoes" on the front of the chair are actually hollow compartments wherein the child's left and right shoes are stored. The child may prepare his or her wardrobe for the following day on the chair, with or without the help of a parent, prior to going to sleep.

The chair is meant to be more than a learning tool for children, it is meant to become the child's daily "buddy" and a communication tool between the parent and the child. The chair may have the ability to speak to a child through recorded messages set by an alarm clock. Messages may include pre-recorded personal announcements using the child's name, such as announcements for time to wake up and get dressed, go to school, go to bed, take a bath, etc.

The learning chair has bodily features of fictional characters. The character portrayed by the chair is varied for the interest of the child, such as a boy's or girl's doll, action figure, cartoon, or robot visage. The face located on the top of the chair is adjustable in the appearance of mood. A child may express different feelings by changing the mood of the face to angry, silly, happy, or sad. The front of the chair's back has a magnetic chalkboard for the parents and child to write messages to one another. All of these items are avenues of communication for the child to express and control emotions, exchange messages and receive regular instructions in a personalized and fun medium.

Parents can help place lettering on the front of the chair spelling out the child's name, or a name given to the chair by a child. Lettering may also be placed on the chair to designate places to store items on hooks or in drawers and compartments.

The learning chair may be constructed of lightweight molded plastic material with sufficient strength to support a range of child's weights with an appropriate safety factor built in. An alternative chair may also be constructed of wood with similar hollowed compartments, clothes hooks, and amenities built onto the chair. The face and name on the chair may be carved into the wooden chair instead of applied with labels. Other materials, such as metal or stone, or various combinations of any materials sturdy enough to form a chair, may be used in construction of a learning chair.

BRIEF DESCRIPTION OF THE DRAWINGS

For a better understanding of the nature of the present invention, reference is had to the following figures and detailed description, wherein like elements are accorded like reference numbers, and wherein.

DESCRIPTION OF THE PREFERRED EMBODIMENTS

Figure 1:
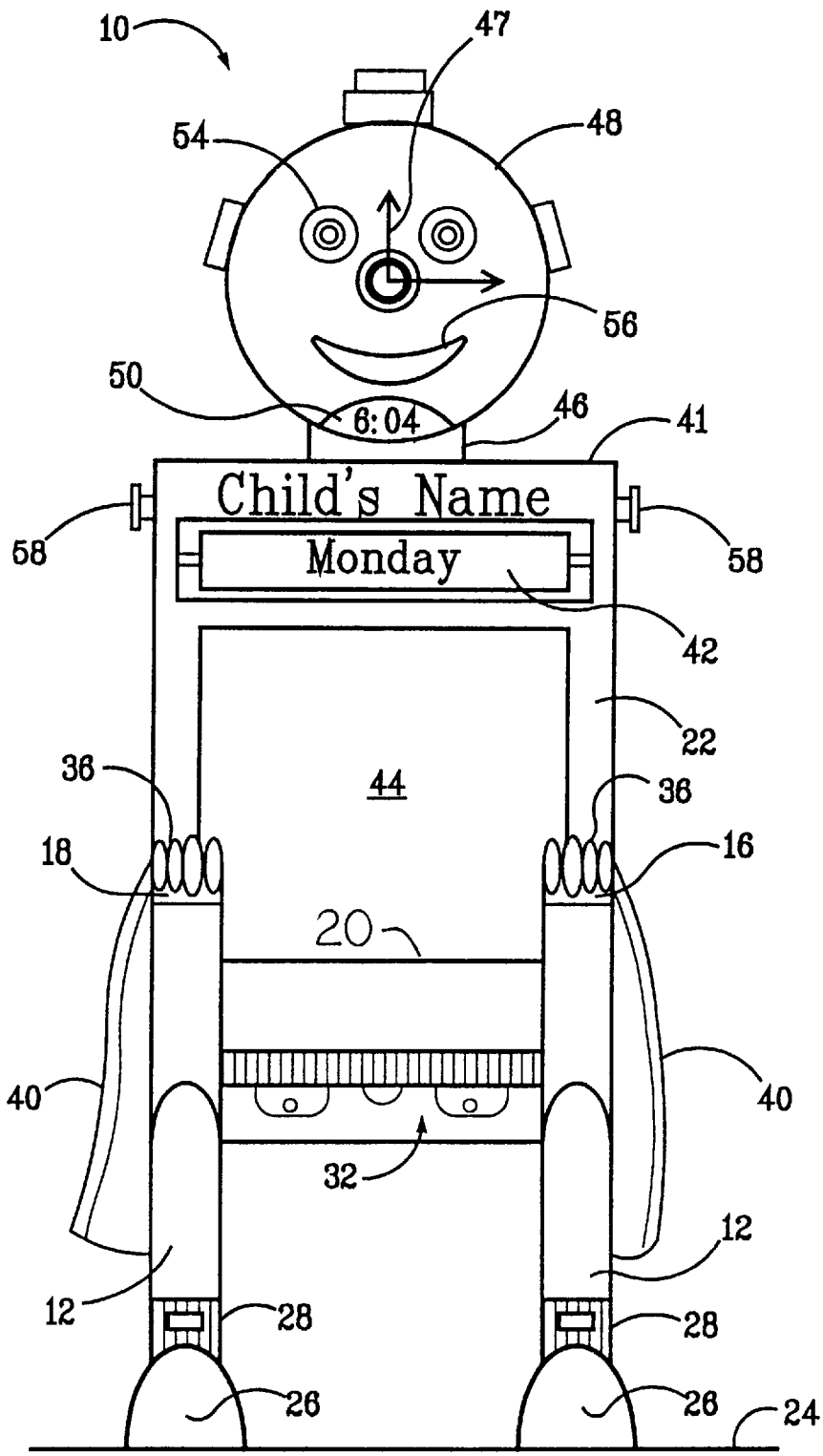
FIG. 1 illustrates a front perspective view of an exemplary embodiment of a learning chair.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
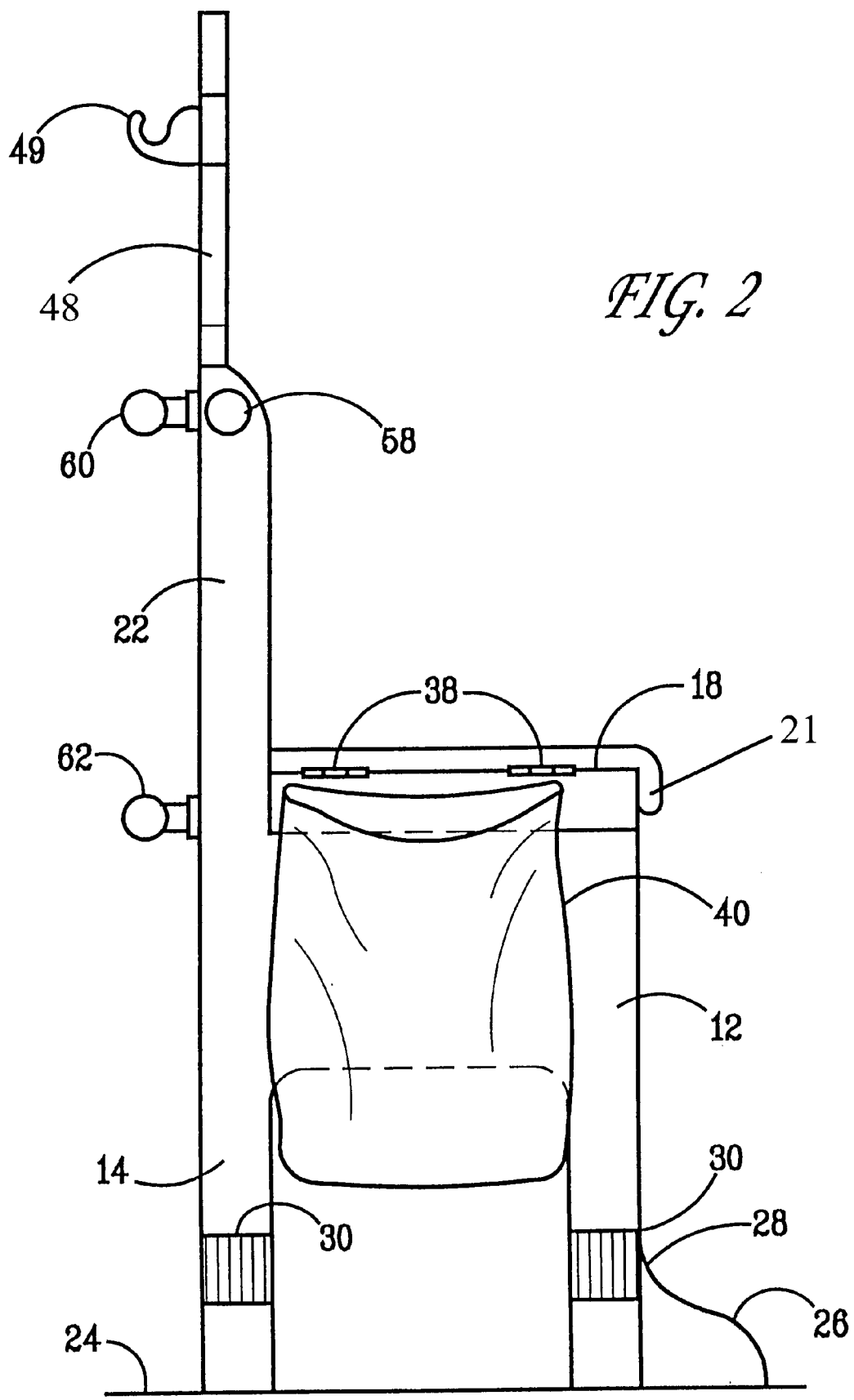
FIG. 2 illustrates a side view of the embodiment of FIG. 1.
Figure 3:
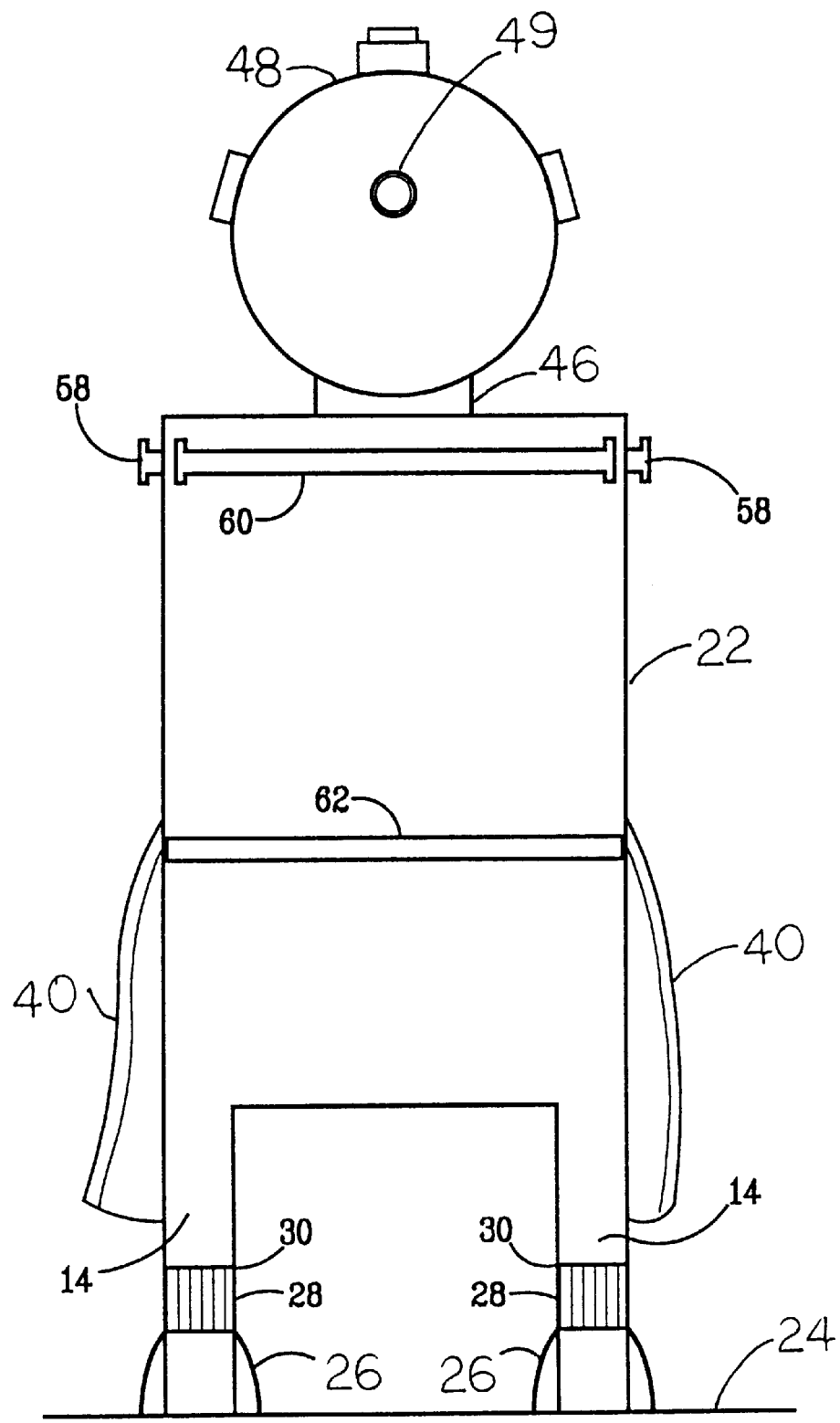
FIG. 3 illustrates a back view of the embodiment of FIG. 1.

In an exemplary preferred embodiment of the learning chair, FIGS. 1, 2, and 3 illustrate front, side, and back views of an exemplary embodiment of the child's learning chair, respectively. Descriptions of directions such as above, lower, front, etc., are made in reference to the configuration of the learning chair in FIG. 1 and are solely for the ease of understanding of the reader and not meant in any limiting sense. A child may sit on, organize clothes with, receive instructions from, and communicate to parents through the learning chair.

An exemplary embodiment of a child's learning chair 10 has front legs 12 illustrated in FIG. 1 and back legs 14 illustrated in FIG. 2. The top of each right and left leg connect at the top to a right arm 16 and a left arm 18, respectively, and support a seat 20. The seat 20, arms 16, 18 and back legs 14 attach to a back 22 of the learning chair 10 that rises perpendicular to a level floor 24. While direct attachment of the arms to the legs is shown, alternative attachment locations can be made without departing from the scope of the invention. For example, the arms can be adjustably (height) attached to the back section 22.

The learning chair 10 portrays facial and bodily indicia of a fictional character, such as a robot, boy, girl, action figure, cartoon character, puppet, or animal, that is attractive, familiar, and friendly to a child. An exemplary preferred embodiment of the learning chair 10 has bodily and facial indicia of a robot, as illustrated in FIG. 1. At the bottom of each front leg 12 of the chair are portrayals of a character's shoes or feet and function as shoe storage compartments 26. Each left and right shoe storage compartment 26 extends out from the chair parallel with the floor 24 from the base of each leg 12. The shoe storage compartments 26 are shaped like a character's shoes or feet, such as shoes or feet on a robot. Each shoe storage compartment 26 opens to allow a child to place a shoe within each compartment. The learning chair assists a child in differentiating between right and left shoes by allowing storage of a child's shoes in their corresponding right and left compartments on the chair. This helps a child learn how to place the correct shoe onto the correct foot.

Each front leg 12 of the chair 10 contains a sock compartment 28. A child's socks may be placed into the top of each of the front legs 12 and retrieved through the compartment 28 at the bottom of the front legs. Socks may be added one at a time into each sock compartment 28 so that a child may retrieve a sock for his or her right or left foot from each right or left sock compartment 28 in the learning chair 10.

The learning chair is designed to grow taller as a child grows. FIG. 2 illustrates where the height of the chair is adjustable via expansion joints 30 located near the lower end of the front 12 and back 14 legs. In a preferred exemplary embodiment, expansion joints 30 are lower leg sections sleeved inside of upper leg sections. The sections have adjustable height increments spaced evenly on all four legs 12, 14.

Figure 4:
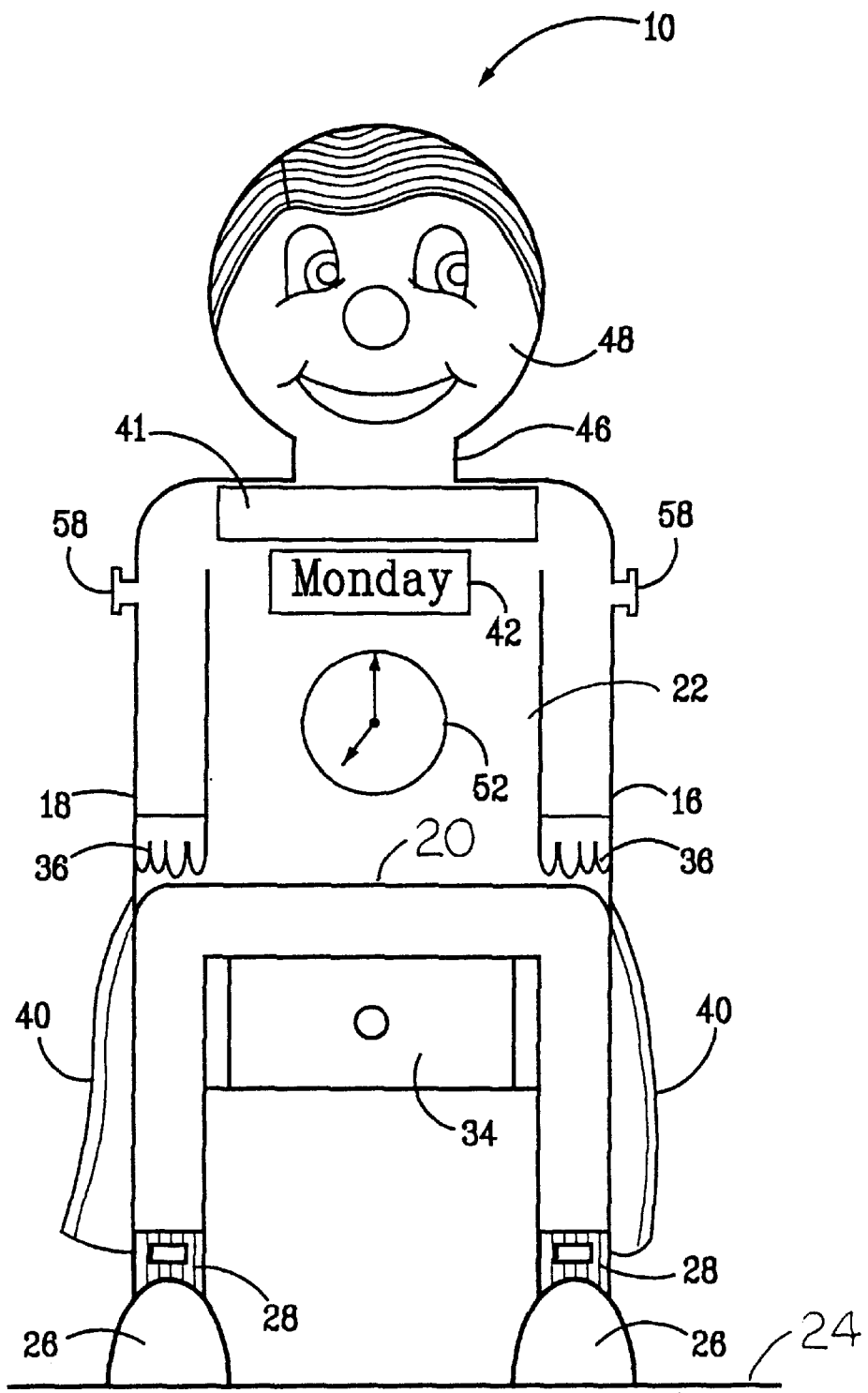
FIG. 4 illustrates a front view of an alternative exemplary embodiment of a learning chair.

FIG. 1 illustrates a seat 20 of the learning chair 10 connected to the chair's legs 12, 14 and back 22. The seat 20 has a lid 21 on its top that is hinged to the chair's back 22. The seat lid 21 opens up giving access to a seat storage compartment 32. The seat storage may be a box made of rigid walls 32 or a sack (not shown) hanging below the seat 20. In an alternative exemplary embodiment as illustrated in FIG. 4, the seat storage is a drawer 34 that slides towards and away from the back of the chair 22 beneath an immovable seat 72.

An exemplary embodiment of the learning chair has left 16 and right 18 arms modeled after fictional robot arms, having hands and fingers 36 resting on top of the front legs 12. A top section of each arm 16, 18 is attached 38 and opens, revealing storage space within each of the arms. Hanging bags 40 are attached to each arm 16, 18 and hang on the outside of the chair 10. In an exemplary preferred embodiment, each hanging bag 40 is attached to a chair's arms 16, 18 with Velcro(™) for easy removal from the chair.

The chair's back piece 22 has display areas for a name 41, a day of the week calendar 42, and message board 44. A child or adult can change the day of the week with a calendar 42 built into the chair back 22. In a preferred exemplary embodiment, the calendar display can be a set of tiles with one day on each tile. On an alternative exemplary embodiment, the calendar may exist as a liquid crystal display or a rotating textual display. A message board 44 is located on the chair back 22, facing the front of the chair. The message board 44 is a typical chalkboard with metallic backing behind it suitable to attract and hold magnets. The left 16 or right 18 arm storage areas may be used for chalk, eraser, and magnet storage. In an alternative exemplary embodiment, the message board 44 has letters of the alphabet bordering around its perimeter.

A neckpiece 46 is attached to the top of the back piece 22. A neckpiece 46 attaches a headpiece 48 to the top back 22. An analog/digital clock 50 is built into the chair's headpiece 48 displaying hours and seconds. The clock 50 also has a processor with memory capacity and electronics for recording messages for playback according to specified alarms. A parent can record a message for a child and have the message play at a certain time period. The child can hear a familiar voice reminding the child to perform certain tasks or follow instructions. In a preferred exemplary embodiment, the learning chair has a selection of pre-recorded messages in the voice of a character embodied by the chair, such as a robot-sounding voice for a chair portraying a robot. A parent or adult may select from a list of pre-recorded instructions to alarm at designated times instead of recording the adult's own voice.

In an alternative exemplary embodiment, analog clock hands 47 are attached at the center of the headpiece 48 that correspond to a digital time clock 50. In an alternative exemplary embodiment illustrated in FIG. 4, an analog clock display 52 is attached to the back 22 of the chair. The clock piece 50 and recorded alarms are powered with batteries or alternating electric current. In an alternative embodiment, an analog clock 52 has a bell or buzzer alarm and is powered by a hand-wound spring (not shown). All embodiments of clocks 50, 52 may have protective plastic covers over them for comfort and protection from damage.

Space for placing lettering for a name 41 is located on the back 22 of the chair. Adults can assist the child in placing individual letters onto the appropriate spaces. The letters may be permanently applied with adhesive, replaceably attached with Velcro (™) or magnetism, or carved or molded into a chair.

In an exemplary preferred embodiment of the learning chair, a headpiece 48 portraying facial indicia of a fictional robot is attached to the top of the chair back 22 via a neck piece 46. The headpiece 48 functions as a storage place for a child's hat. Facial indicia include removable eyes 54 and mouthpieces 56 that can be replaced with similar pieces illustrative various expressions. Expressions such as angry, silly, sad, and happy are all interchangeable by a child. In an alternative exemplary embodiment illustrated in FIG. 4, the headpiece 48 is illustrated with facial and bodily indicia of a young boy. However, in other alternative exemplary embodiments, indicia can be varied to another fictional character such as a girl, cartoon figure, puppet, action figure, animal, or puppet that is familiar to a child.

The learning chair has a plurality of rods and hooks on which to hang child's clothing. FIG. 1 illustrates locations of two hanger knobs 58 on either side of the top portion of the back 22 of the chair. FIGS. 2 and 3 illustrate a rod 60 mounted at the top of the back 22 of the chair. An additional clothing rod 62 is mounted near the mid-section of the rear of the chair's back piece 22. A hook 49 is centered on the back of the headpiece 48 for hanging items of clothing. The hooks and rods may be labeled "PANTS ROD" or "SHIRT ROD." Alternative shirt and pants or dress/skirt attachment locations or methods can be substituted without departing from the scope of the present invention. However, the specific clothing pieces should generally be located relative to the chair character where they would go on the child. For example, the shirt on the chest area and pants near the waist/legs.

Figure 6:
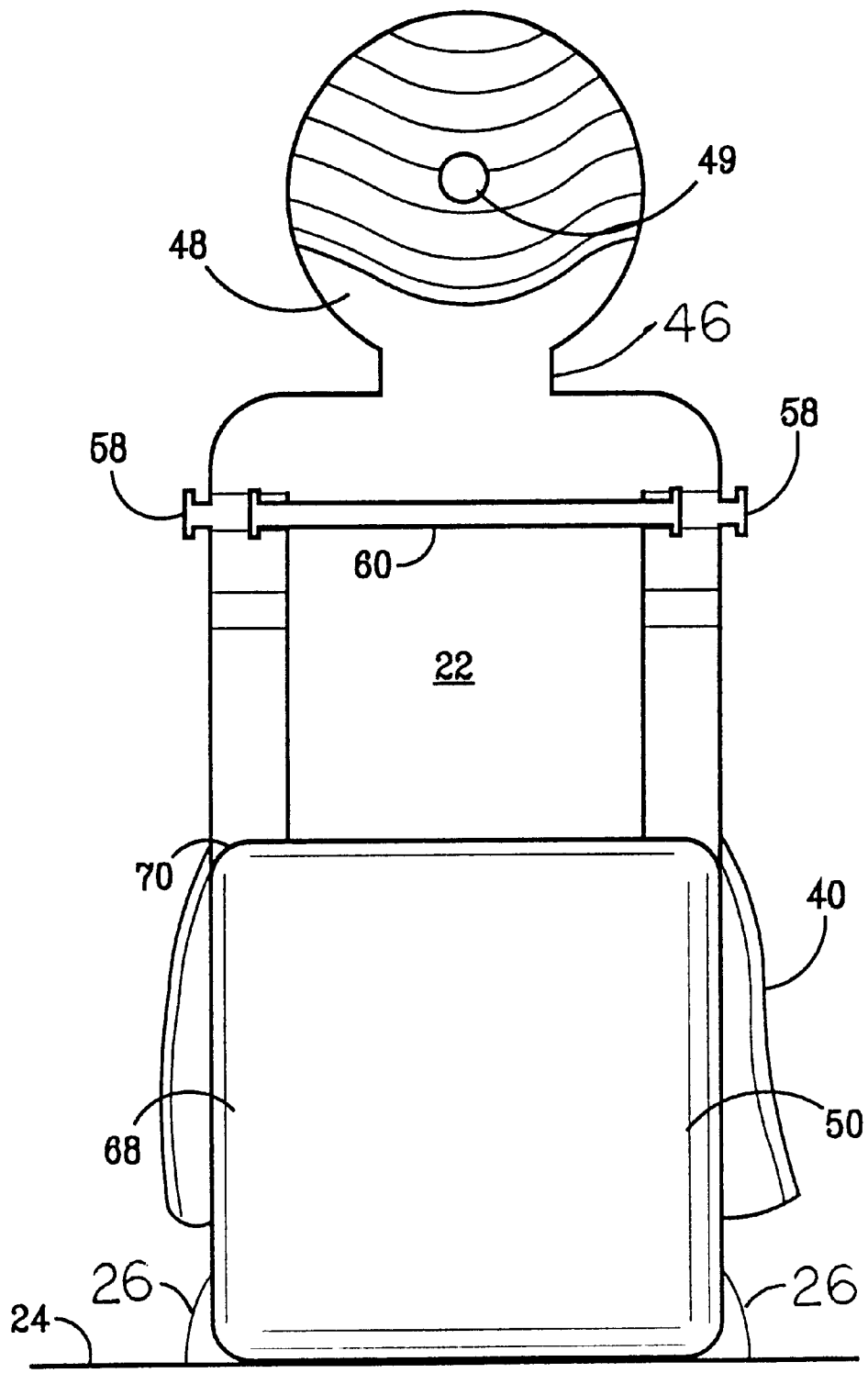
FIG. 6 illustrates a rear view of the alternative embodiment in FIG. 4.

Alternative exemplary preferred embodiments are illustrated in FIGS. 4, through 6. In FIG. 4, the learning chair 10 has two shoe storage compartments 26 that are designed as the shoes of the character portrayed on by the and sock storage compartments 28 along with side storage bags 40. A storage drawer 36 is attached to the chair underneath the seat 20. The chair has left 16 and right 18 arms with illustrated hands 36 on the front ends of the arms. An analog clock 52 is attached or built into the rising back 22 of the chair on the front side. A day of the week calendar 47 is attached to the front side of the back 22. Space and lettering for a name 41 is provided near the top of the back 22.

Figure 5:
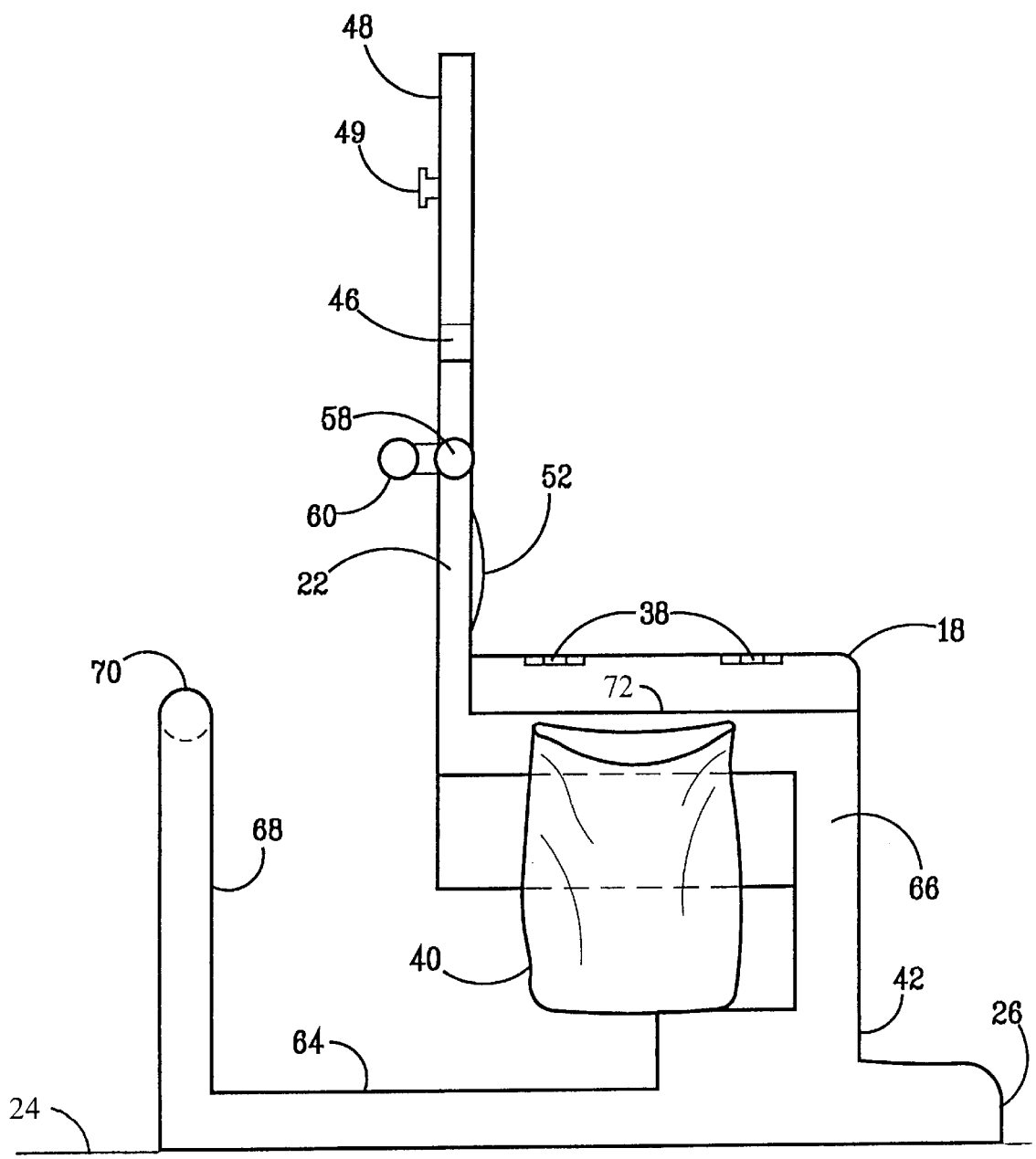
FIG. 5 illustrates a side view of the alternative embodiment in FIG. 4.

FIG. 5 illustrates an alternative exemplary embodiment of the base 64 of the learning chair 10. The base 64 of the learning chair is formed from a counter-balanced section extending backwards from the front section 66 beyond the vertical plane of the back 22. The base 64 extends vertically 68 from the floor 24, terminating as a clothing bar 70. Attached to the back of the headpiece 48 is a hook 49 for hanging items of clothing. A clothing bar 60 is also attached to the back of the chair. FIG. 6 is a rear-view illustration of the alternative exemplary embodiment of FIGS. 4 and 5.

The learning chair may be constructed principally of plastic or of a combination of plastic, metal, stone, wood, or cloth. An alternative embodiment may be constructed out of wood as the basic chair with addendums such as a digital or analog clock and message board constructed from appropriate materials.

Conclusion

A system and method has been shown in the above embodiments for the effective implementation of a child's learning chair. While various preferred embodiments have been shown and described, it will be understood that there is no intent to limit the invention by such disclosure, but rather, it is intended to cover all modifications and alternate constructions falling within the spirit and scope of the invention, as defined in the appended claims.

What is claimed is:

1. A child's learning chair, said chair assisting in the development of a plurality of basic skills used in a child's daily routine and having facial and bodily similarities to a fictional character, said chair comprising:
   a chair structure including at least legs, seat, arms, back, and head piece, said chair structure emulating specific body parts;
   a plurality of clothes receiving sections, said clothes receiving sections providing attachment or storage of said clothes;
   said clothes receiving sections located proximal to one or more of said specific body parts based on a correlation of the clothing to an associated body part, and
   wherein said child's learning chair assists a child in organizing clothing and dressing by associating specific pieces of clothing with appropriate placement on the specific body parts of the chair.

2. A child's learning chair according to claim 1, wherein said clothes receiving sections providing attachment comprise a plurality of bars and hooks attached to one or more of said head piece, back, and arms of said chair.

3. A child's learning chair according to claim 1, wherein said clothes receiving sections providing storage comprise one or more storage compartments located in the legs, attachments to the legs, in the arms, attachments to the arms, or seat of said chair.

4. A child's learning chair according to claim 1, wherein said specific pieces of clothing comprise shoes and said chair comprises left and right shoe receiving storage compartments, said compartments located proximal to a lower section of one or more front legs.

5. A child's learning chair according to claim 4, wherein said specific pieces of clothing comprise socks, said socks stored within sock receiving storage compartments, said compartments located proximal to said shoe receiving storage compartments.

6. A child's learning chair according to claim 1, wherein front legs of said chair are hollow and accessible for either socks and/or shoes storage.

7. A child's learning chair according to claim 1, wherein said chair is adjustable in one or more of: height of seat, height of arms, facial expressions of said fictional character, or message indicia.

8. A child's learning chair according to claim 1, further comprising a seat storage section under said seat having a lid attached to the back of said chair.

9. A child's learning chair according to claim 1, wherein said arms on said chair are hollowed storage compartments accessible through a movable portion of said arms.

10. A child's learning chair according to claim 1, further comprising reclosable hanging bags;
   the top of said hanging bags attached to the outside of said arms.

11. A child's learning chair according to claim 1, further comprising an erasable message board attached to said back piece of said chair, said message board having alphanumeric lettering inside the perimeter of said message board.

12. A child's learning chair according to claim 1, further comprising a time display attached to said chair, said time display being a digital or analog clock.

13. A child's learning chair according to claim 12, further comprising an electronic recording and playback device integrated with said time display, said electronic recording and playback device having pre-recorded sounds or speech that alarm at determinable time periods.

14. A child's learning chair according to claim 1, wherein said clothing receiving sections receive any of: shoes, socks, pants, shorts, dresses, hats, or watches.

15. A child's learning chair according to claim 1, wherein said fictional character comprises one or more of the following characterizations: robot, cartoon, doll, action figure, storybook character, girl, boy, animal, or puppet.

16. A child's learning chair according to claim 1, wherein said chair legs are constructed with a base extending down from said seat in a continuous form, said base extending back past the back edge of said seat, said base extending vertically near the horizontal plane of said seat.

17. A child's learning chair according to claim 1, further comprising a seat storage area under said seat, said seat storage area having a removable lid or sliding access drawer.

18. A child's learning chair according to claim 1, wherein said clothes receiving sections providing storage comprise hanging bags, the top of said hanging bags attached to the outside of said arms of said chair.

* * * * *